July 14, 1925. 1,545,974
N. B. POST
CORN POPPING MACHINE
Original Filed Feb. 28, 1924   3 Sheets-Sheet 1

Witnesses:

Inventor:
Nathaniel B. Post, Deceased
By Clarence A. Post
Administrator.
By Joshua R. H. Potts
His Attorney.

July 14, 1925.
1,545,974
N. B. POST
CORN POPPING MACHINE
Original Filed Feb. 28, 1924    3 Sheets-Sheet 2

Witnesses:

Inventor:
Nathaniel B. Post, Deceased
by Clarence A. Post
Administrator.
By Joshua R. H. Potts
His Attorney.

July 14, 1925

N. B. POST

CORN POPPING MACHINE

Original Filed Feb. 28, 1924    3 Sheets-Sheet 3

1,545,974

Witnesses:

Inventor:
Nathaniel B. Post, Deceased
by Clarence A. Post
Administrator.

By Joshua R H Potts
His Attorney.

Patented July 14, 1925.

1,545,974

UNITED STATES PATENT OFFICE.

NATHANIEL B. POST, DECEASED, LATE OF CHICAGO, ILLINOIS; BY CLARENCE A. POST, ADMINISTRATOR, OF CHICAGO, ILLINOIS, ASSIGNOR TO THE CRACKER JACK CO., OF CHICAGO, ILLINOIS, A CORPORATION OF ILLINOIS.

CORN-POPPING MACHINE.

Original application filed February 28, 1924, Serial No. 695,840. Divided and this application filed July 5, 1924. Serial No. 724,294.

*To all whom it may concern:*

Be it known that NATHANIEL B. POST, deceased, who was a citizen of the United States, and a resident of the city of Chicago, county of Cook, and State of Illinois, had during his lifetime invented certain new and useful Improvements in Corn-Popping Machines, of which the following is a specification.

This invention relates to corn popping machines, and more particularly to the rotary cylinder type having means for continuously separating the popped from the unpopped corn and for continuously delivering said popped corn.

This application is a division of the appleation for corn popping machines, of NATHANIEL B. POST, deceased, filed February 28, 1924, Serial No. 695,840; and this application particularly concerns the main popping cylinder, which is especially adapted for use with preheating cylinders, as fully disclosed in the above identified parent application.

An object of the invention is to provide such a popping machine with means for gradually and continuously feeding the corn through the machine, in order to heat it gradually and to continuously and speedily discharge the popped corn.

Another object is to provide means for speedily delivering all popped corn directly upon popping, in order to avoid scorching or injuring the same.

Another object is to provide a preliminary popping chamber in the popping cylinder with means therein for picking up and separating the popped corn from the unpopped corn and delivering it directly centrally into a delivery tube for rapid discharge from the machine.

Another object is to provide means in the main popping cylinder of the machine for constantly and speedily picking up the popped corn and delivering it into a central delivery tube, away from the main heat at the surface of the cylinder, and at the same time leading the unpopped corn along the outer wall of the cylinder close to the strongest heat.

And another object is to provide a plurality of pick-up means, especially adapted for large cylinders, for gathering the popped corn, and to provide a delivery tube having means for receiving said popped corn from said pick-up means and rapidly discharging the same.

Other objects will appear hereinafter.

The invention consists in the combinations, and arrangements of parts hereinafter described and claimed.

The invention will be best understood by reference to the accompanying drawings forming a part of this specification, and in which, Fig. 1 is an elevation of the popping machine viewed from the receiving and delivering end thereof;

Figure 1:
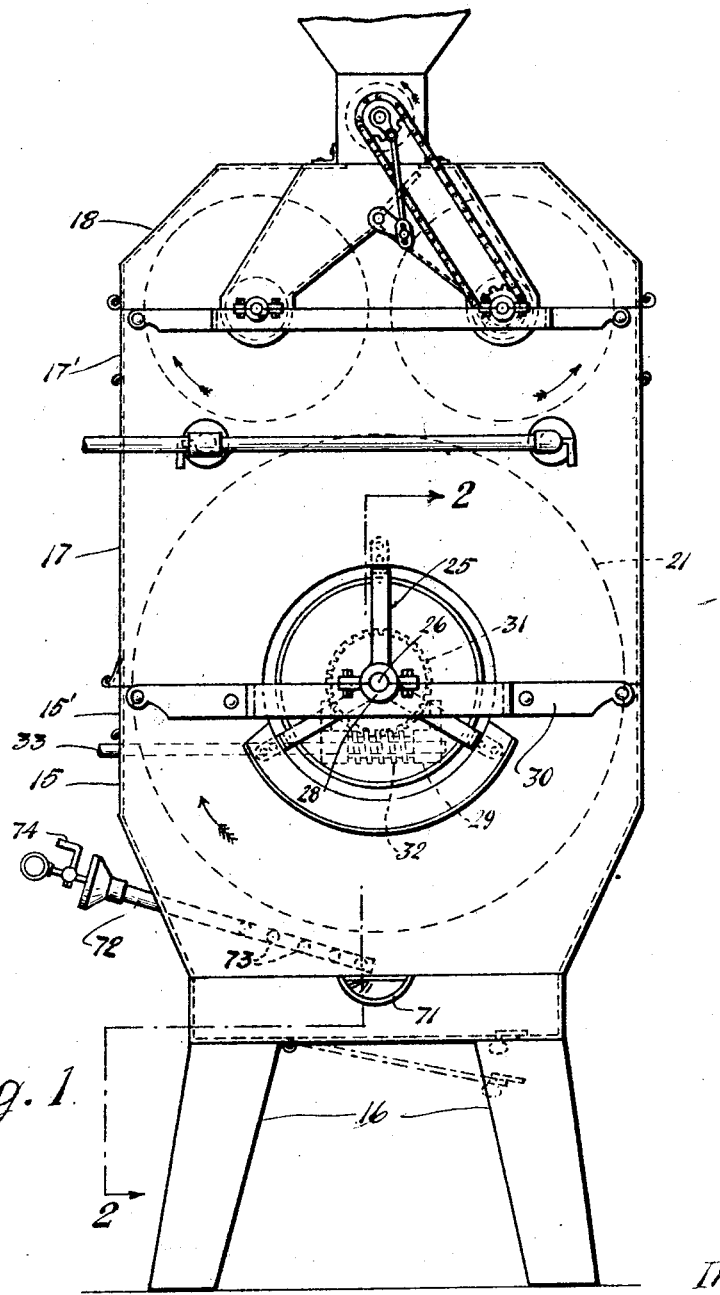

The form of invention illustrated in the drawings includes a machine casing or housing consisting of three separable parts, a lower part 15 supported on standards 16 and extending to the axis of the main popping cylinder, an intermediate part 17 extending to the axis of the preliminary popping and heating cylinders and an upper part or hood 18 mounted thereon. The parts 15 and 17 are provided with inspection openings 15' and 17' respectively, for inspecting the interior mechanism of the machine and to provide ready access thereto.

The main popping cylinder 21, which forms the subject matter of this divisional application, is preferably made of fine wire gauze and provided with heads 22 and 23 fastened, respectively, by means of spiders 24 and 25, upon a shaft 26 journalled in bearings 27 and 28 provided on guard plates 29 and 30 which are fastened to the ends of the lower part 15 of the casing. Said shaft is driven by an attached worm wheel 31 actuated by a worm 32 provided on a drive shaft 33 which is rotated by any suitable force of power and is mounted in brackets 34 fastened on the guard plates or bars 29. The corn or material to be popped is fed from the preheaters or preheating cylinders through a delivery spout 36 provided at one end of the casing or housing, and through a funnel shaped end 37 of said spout into the inlet end of the main popping cylinder.

Figure 4:
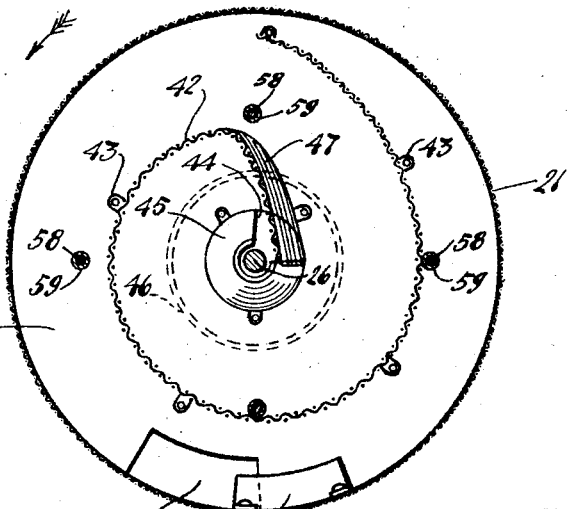
Fig. 4 is a vertical section taken across the preliminary chamber of the main cylinder on line 4—4 of Fig. 2.

A plurality of cross partitions 40 and 41 divide the main cylinder into chambers or compartments, thereby preventing the popping corn from jumping any great distance lengthwise of the cylinder. Said chambers are alike in construction, except the first chamber between the cylinder head 22 and the next partition 40, this chamber forms a receiving chamber and is especially constructed as a preliminary popping chamber. A separator screen 42 is mounted in this preliminary popping chamber and is fastened to partition 40 by any suitable means 43 (see Figs. 2 and 4). Said screen begins a short distance, about ¾ inch, from the outer or gauze wall of cylinder 21 to let the unpopped corn pass by it, and extends spirally inward to a slot 44 provided on a conical tube 45 mounted at the center of said chamber for discharging corn, which has been popped in the preheaters or which pops in this preliminary chamber, directly into the delivery tube 46 provided at the center of the cylinder. The screen 42 is curved forward at the inner portion 47, adjacent shaft 26, to force the popped corn toward tube 46, and a space is left under said inner portion 47 for the free entrance of corn from the end 37 of spout 36. Said screen is of proper mesh to let the unpopped corn pass through to the outer end of the cylinder and so as to come near to the source of heat. Inclined deflector plates 48 are mounted at the outer wall of said chamber to move the unpopped corn toward and through an opening 49 in partition 40 into the next popping chamber, and curved deflecting plates 50 are provided at the outer part of each partition 41 for moving the unpopped corn step by step through openings 51 formed by said deflecting plates into the succeeding chambers.

Figure 3:
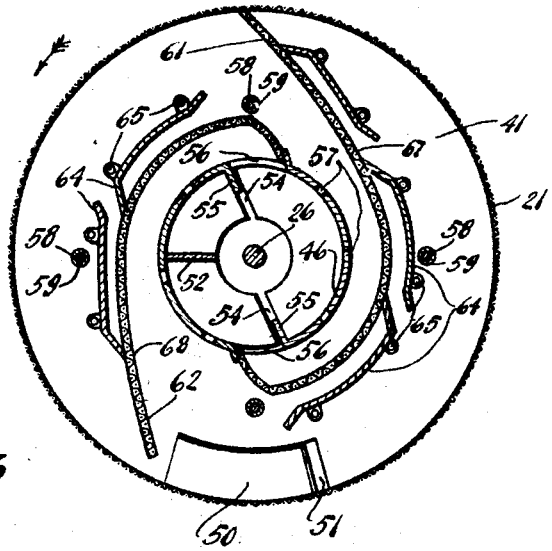
Fig. 3 is a vertical section taken across the main popping cylinder on line 3—3 of Fig. 2.

The delivery tube 46 is provided with separately formed conveyer flights or screw threads 52 for forcing the popped corn speedily to the open discharge end. These threads are formed in two longitudinally extending halves, each half being fastened to a corresponding half on the delivery tube, and said two halves of tube and screw threads being held together by rings 53 at the two ends of the tube. The two halves of the threads are substantially joined (see Fig. 3) with a narrow space 54 left between them for receiving the thin metallic deflecting lips 55 turned inward from one side of each half of the delivery tube 46 for preventing the popped corn delivered into said tube from falling out through the longitudinal intake slots 56. Several rows of openings 57 are provided in said tube for the unpopped kernels and small kernels to drop back into the cylinder. Tie rods 58 and spacing sleeves 59 thereon hold the partitions 40 and 41 and the cylinder heads 22 and 23 together and in position.

Means are provided in each popping chamber or compartment for picking up the popped corn in that chamber and for delivering it into the delivery tube 46. Said means comprises one or more main pick-up screen, two such main screens being preferably used in the average cylinder (see Figs. 3 and 5), a primary screen 61 extending spirally from the outer wall of the cylinder 21 to the intake slot 56 on tube 46, and a secondary screen 62 beginning a short distance from said outer wall and extending spirally into a second intake slot 56 on tube 46. Each of said means is provided with shields 64 for deflecting the direct heat from the burners, and said shields are fastened to partitions by means of rivets 65 passing through ears on said shields, or in any suitable manner. The spaces between the outer end of said secondary screen and the outer wall is about ¾ inch and is provided to let the unpopped corn pass freely along the outer cylinder wall; more than one such secondary screen will be used in the large cylinders.

Figure 5:
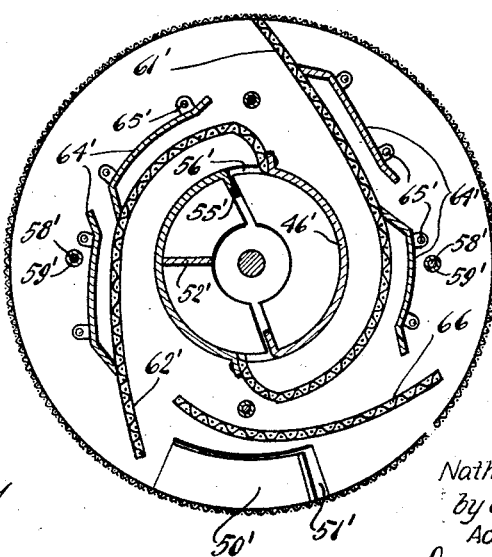
Fig. 5 is a cross section of a modified form of popping cylinder, taken substantially in the same position as Fig. 3.

The modified form shown in Fig. 5 is similar in construction to the form above described, being provided with screw threads 52', also deflecting lips 55' and intake slots 56' on the delivery tube 46', and with tie rods 58' and spacing sleeves 59', and being further provided with a primary screen 61' and secondary screen 62', each of which screens is provided with shields or heat deflecting means 64' and fastening means 65'. In addition to these elements, as used in the preceding form, this modified form also includes intermediate or auxiliary screens 66, placed intermediate the main screens 61' and 62', as shown in Fig. 5.

Pick-up screens are constructed to extend the entire length of the main popping portion of cylinder 21. Slots 67 and 68 are provided in the intermediate partitions for inserting the screens 61 and 62 respectively, said screens being inserted in said slots from the discharge end of the cylinder before the cylinder head 23 has been fastened in position, and said screens are held in place between said cylinder head 23 and the first partition 40 by the fastening or tightening of the tie rods 58. These screens are readily removed and replaced by removing the tie rods and cylinder head 23 and the adjacent parts of the casing.

A spout 69 is provided on the outlet end of casing part 15 for delivering the popped corn from tube 46, and a waste opening 70 is provided in cylinder head 23, a short distance from the outer wall for discharging all accumulation of waste corn and material through a waste spout 71 at the lower end of the casing.

Figure 2:
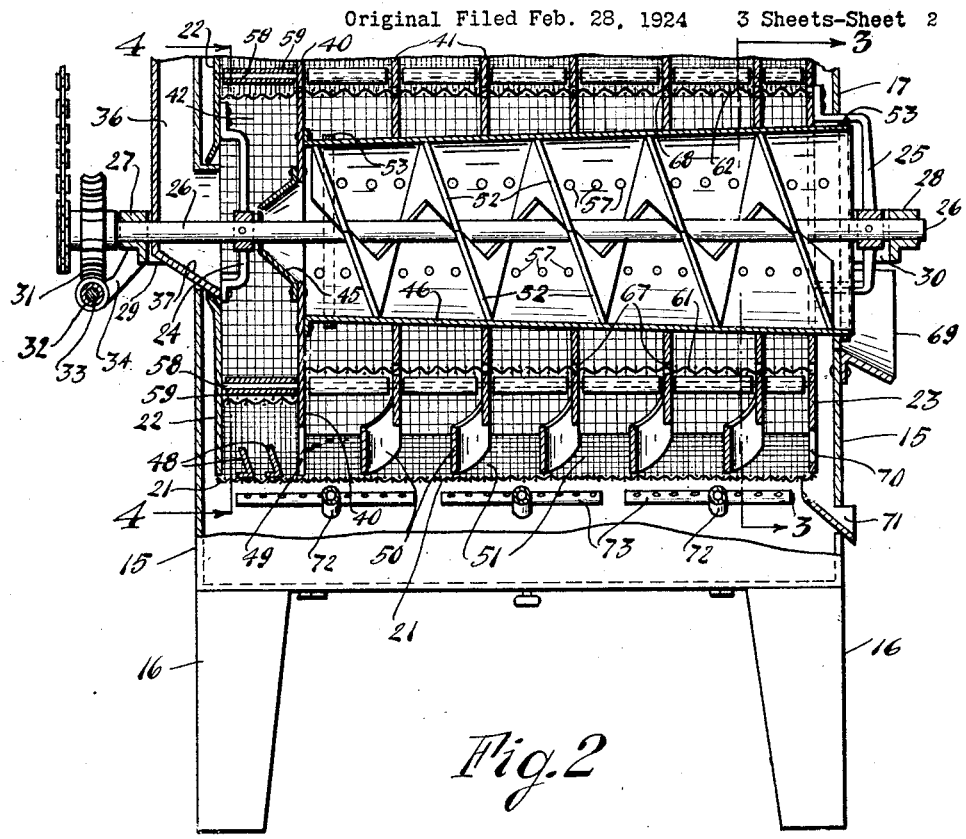
Fig. 2 is a longitudinal section of the machine taken on line 2—2 of Fig. 1.

The means for heating the corn comprises main heating means 72, which may be in the form of the usual gas burners or any other suitable means, preferably arranged crosswise under the upward revolving quarter of the main cylinder, and said means or burners are preferably provided with heating fingers 73 extending lengthwise of the cylinder and nearly joining with their ends, as shown in Fig. 2, and a valve 74 is provided for each burner for regulating it separately to finish popping the corn properly as it progresses through the successive popping chambers of the cylinder.

This main cylinder is especially adapted for use with the preheating cylinders, disclosed in the above identified parent application, in view of the fact that the pick-up means 42 in the preliminary popping chamber of this main popping cylinder has been provided and constructed to gather popped corn and deliver it directly to its cone 45 into the delivery tube 46 for rapid delivery from the machine, while the unpopped corn is dropped through said screen 42 to the outer wall of the cylinder 21 and is subjected to the direct heat of the main burners 72.

The operation of the various parts of the machine has been explained with the description of the parts, and it is also apparent that the progress of the corn through the entire cylinder is gradual and that the corn is subjected to the gradual increasing heat through the machine, thus insuring a thorough and most complete popping thereof, and that the popped corn is completely separated from defected kernels and waste and speedily discharged from the machine with a continuous stream.

While herein is illustrated and described the preferred form of construction for carrying this invention into effect, this is capable of variation and modification without departing from the spirit of the invention. It is therefore desired to be understood that this invention is not limited to the precise details of construction set forth, but includes such variations and modifications as come within the scope of the appended claims.

Having described my invention, what I claim as new and desire to secure by Letters Patent is:

1. In a popping machine, a popping cylinder provided with a plurality of sections and a central tubular member for discharging popped grain rapidly from said sections, and spiral means in each section for picking up popped grain and leading it into said tubular discharge means.

2. In a popping machine, a popping cylinder provided with a plurality of sections and with a tube extending therethrough for rapidly discharging popped grain from said machine, and a plurality of spiral means in said sections for picking up the popped grain and delivering it into said tube, said tube being provided with perforations for discharging unpopped grains from said tube into said cylinder.

3. In a popping machine, a cylinder provided with a plurality of partitions forming a receiving chamber and additional chambers, means centrally of said cylinder for rapidly delivering popped grain therefrom, means in said additional chambers for picking up popped grain and placing it in said delivering means, and means in said receiving chamber including means curved spirally outwardly and from the central part of said chamber for delivering popped grain centrally thereof directly into said delivering means.

4. In a popping machine, a cylinder provided with a plurality of partitions forming a receiving chamber and additional chambers, means extending centrally of said cylinder for rapidly delivering popped grain therefrom, and means in said receiving chamber including a central member and means curved spirally outwardly therefrom for separating popped from unpopped grain and discharging said popped grain directly into said central delivering means.

5. In a popping machine, a cylinder with a preliminary popping chamber and additional chambers forming a main popping portion, a delivering member extending through said main portion, a slotted member in said preliminary chamber leading into said delivering member, and a foraminous member extending outwardly from said slot in said chamber for picking up popped corn to deliver it into said delivering member and for dropping the unpopped corn therethrough.

6. In a popping machine, a rotary cylinder provided with a preliminary popping chamber and additional chambers forming a main popping portion, a delivery tube extending centrally through said main portion for rapidly delivering the popped corn, a slotted conical member in said preliminary chamber and leading into said delivery tube, a foraminous member extending from said slot spirally outwardly to a short distance from the outer wall in said chamber for delivering popped corn into said conical member and permitting the unpopped corn to travel adjacent said outer wall, and means for moving the unpopped corn from said chamber into said main popping portion.

7. In a popping machine, a rotary cylinder with a plurality of partitions forming a receiving chamber and additional chambers connected thereto, a delivering member extending centrally from said receiving chamber through the additional chambers, a slotted cone in said receiving chamber discharging into said delivering member, a separator screen extending spirally from the cone slot to adjacent the outer wall of said receiving chamber and providing a passage for the unpopped corn between its outer end and the cylindrical wall of said chamber.

8. In a popping machine, a rotary cylinder having a plurality of partitions forming a preliminary or receiving chamber and a plurality of similar additional chambers, means for delivering popped grain from said preliminary chamber and from said additional chambers, means in said preliminary chamber for gathering popped corn and discharging it directly into said delivering means, main pick-up means in said additional chambers for delivering popped grain into said delivering means, and an auxiliary pick-up member for delivering popped grain onto said main pick-up means.

9. In a popping machine, a rotary cylinder, a member in said cylinder for delivering popped corn, and a plurality of foraminous members extending spirally from spaced openings in said delivering member and spaced circumferentially there around for gathering popped corn and delivering it into said delivering member.

10. In a popping machine, a rotary cylinder, a tubular member in said cylinder for delivering popped corn therefrom, a plurality of separator screens extending spirally from said tubular member and spaced circumferentially there around, one of said screens extending to the outer wall of said cylinder and another of said screens extending a trifle short of said wall providing a grain passage between its end and said wall.

11. In a popping machine, a rotary cylinder, a delivery tube extending lengthwise of said cylinder, a primary separator screen extending spirally from a slot in said tube to the outer wall of said cylinder, and another separator screen extending spirally from a slot in said tube to a line near the outer wall of said cylinder.

12. In a popping machine, a rotary cylinder, a member in said cylinder for delivering popped corn, a plurality of partitions in said cylinder for limiting the movement of popping corn, and a plurality of foraminous pick-up members connected to slots in said delivering member and extending through said partitions lengthwise of said cylinder.

13. In a popping machine, a rotary cylinder, a delivery tube extending lengthwise of said cylinder, a plurality of circular partitions forming similar compartments in said cylinder, and a plurality of pick-up screens extending through said partitions lengthwise of said cylinder and from slots in said tube spirally outward, one of said screens extending to the outer wall of said cylinder.

14. In a popping machine, a rotary cylinder, a delivering member in said cylinder, main pick-up means extending from a slot in said delivering member spirally outward, and an auxiliary pick-up means leading toward said main pick-up means for guiding popped corn thereto.

15. In a popping machine, a rotary cylinder, a delivery tube extending longitudinally through one end piece of said cylinder, a plurality of partitions in said cylinder, said partitions being provided with a plurality of similar slots extending spirally from said delivery tube, and a plurality of pick-up screens removably mounted in said slots lengthwise of said cylinder.

16. In a popping machine, a popping cylinder, a circular partition in said cylinder forming a chamber between it and one end piece, a plurality of partitions forming a plurality of compartments in said cylinder, a delivery tube extending through said partitions, a slot extending spirally outward from said tube through said partitions, and a pick-up screen extending through said slots from said circular partition to the second end piece of said cylinder.

17. A popping cylinder comprising a plurality of popping compartments, a delivery tube with spiral threads therein, flanges with adjacent slots extending longitudinally inward from said tube and forming means for retaining grain in said tube, and means in said compartments for discharging popped grain through said slots into said tube.

18. A popping cylinder comprising a series of similar popping compartments, a delivery tube provided with spiral threads therein extending axially of said cylinder, lips bent inward from said tube providing intake slots and forming means for retaining popped grain in said tube, and means in said compartments for picking up and delivering popped grain through said slots into said tube.

19. A popping cylinder comprising a plurality of compartments, a delivery tube having spiral conveyor threads and extending centrally through said compartments, said tube being formed in semi-cylindrical halves with the corresponding half of the spiral threads mounted therein, lips bent longitudinally inward from said cylindrical halves providing openings for the reception of grain from said compartments, said lips being placed longitudinally between said halves of spiral threads and forming means for retaining grain in the said tube, and means for holding said halves together.

In testimony whereof, I, CLARENCE A. POST, the administrator of the estate of NATHANIEL B. POST, deceased, have signed my name to this specification in the presence of two subscribing witnesses.

CLARENCE A. POST,
*Administrator of the Estate of Nathaniel B. Post, Deceased.*

Witnesses:
    EDWIN A. WEGNER,
    W. G. ECHSTEIN, JR.